(12) United States Patent
Lu et al.

(10) Patent No.: US 11,375,397 B2
(45) Date of Patent: Jun. 28, 2022

(54) CONNECTION MANAGEMENT METHOD, APPARATUS, COMPUTER DEVICE AND STORAGE MEDIUM

(71) Applicant: GUANGDONG OPPO MOBILE TELECOMMUNICATIONS CORP., LTD., Dongguan (CN)

(72) Inventors: Qianxi Lu, Dongguan (CN); Jianhua Liu, Dongguan (CN); Zhenshan Zhao, Dongguan (CN); Huei-Ming Lin, South Yarra (AU)

(73) Assignee: GUANGDONG OPPO TELECOMMUNICATIONS CORP., LTD., Donnguan (CN)

( * ) Notice: Subject to any disclaimer, the term of this patent is extended or adjusted under 35 U.S.C. 154(b) by 0 days.

(21) Appl. No.: 17/460,017

(22) Filed: Aug. 27, 2021

(65) Prior Publication Data
US 2021/0392541 A1     Dec. 16, 2021

Related U.S. Application Data

(63) Continuation of application No. PCT/CN2019/081789, filed on Apr. 8, 2019.

(30) Foreign Application Priority Data

Mar. 28, 2019    (WO) ................ PCT/CN2019/080191

(51) Int. Cl.
*H04W 28/02*     (2009.01)
(52) U.S. Cl.
CPC ................. *H04W 28/0268* (2013.01)
(58) Field of Classification Search
CPC .................................................... H04W 28/02
See application file for complete search history.

(56) References Cited

U.S. PATENT DOCUMENTS

2012/0069763 A1 * 3/2012 Zhao ................ H04W 28/24
                                                                     370/252
2014/0194115 A1     7/2014 Yang et al.
(Continued)

FOREIGN PATENT DOCUMENTS

CN        103139930 A      6/2013
CN        104349303 A      2/2015
(Continued)

OTHER PUBLICATIONS

International Search Report issued in corresponding International Application No. PCT/CN2019/081789, dated Dec. 30, 2019, 31 pages.
(Continued)

*Primary Examiner* — Ayanah S George
(74) *Attorney, Agent, or Firm* — Bayes PLLC

(57) ABSTRACT

Disclosed are a connection management method, and a computer device. The method includes sending, by a first terminal, a request message carrying a first QoS parameter to a second terminal. The request message is used for indicating to perform a connection operation between the first terminal and the second terminal according to the first QoS parameter. The connection between the first terminal and the second terminal includes connection for QoS flow, and the connection operation includes at least one of the following: establishing a connection between the first terminal and the second terminal, modifying the connection between the first terminal and the second terminal, or releasing the connection between the first terminal and the second terminal.

18 Claims, 6 Drawing Sheets receiving, by a second terminal, a request message carrying a first QoS parameter sent by a first terminal, wherein the request message is used for indicating to perform a connection operation between the first terminal and the second terminal for the first QoS parameter    S401

(56) References Cited

U.S. PATENT DOCUMENTS

| | | | | |
|---|---|---|---|---|
| 2015/0080002 A1* | 3/2015 | Cho | ...................... | H04W 76/14 |
| | | | | 455/450 |
| 2017/0013497 A1 | 1/2017 | Lee et al. | | |
| 2019/0239112 A1* | 8/2019 | Rao | ...................... | H04W 28/06 |
| 2020/0178343 A1* | 6/2020 | Kim | ...................... | H04W 76/27 |
| 2020/0245394 A1* | 7/2020 | Wu | ...................... | H04W 76/14 |

FOREIGN PATENT DOCUMENTS

| | | |
|---|---|---|
| CN | 106162929 A | 11/2016 |
| CN | 106162930 A | 11/2016 |
| CN | 108923894 A | 11/2018 |
| CN | 109257831 A | 1/2019 |
| WO | 2018137364 A | 8/2018 |

OTHER PUBLICATIONS

PCT Written Opinion of the International Searching Authority issued in corresponding International Application No. PCT/CN2019/081789, dated Dec. 30, 2019, 7 pages.

International Search Report issued in corresponding International Application No. PCT/CN2019/080191, dated Jan. 2, 2020, 30 pages.

PCT Written Opinion of the International Searching Authority issued in corresponding International Application No. PCT/CN2019/080191, dated Jan. 2, 2020, 7 pages.

"New SID: Study on NR V2X", Agenda Item: 9.1.5, Source: Vodafone, 3GPP TSG RAN Meeting #80, RP-181480, Revision of: RP-181429, La Jolla, USA, Jun. 11-14, 2018, 5 pages.

Extended European Search Report issued in corresponding European Application No. 19922093.0, dated Jan. 20, 2022, 12 pages.

First Office action issued in corresponding India Application No. 202127039806, dated Mar. 15, 2022, 7 pages.

"3rd Generation Partnership Project; Technical Specification Group Services and System Aspects; Study on architecture enhancements for EPS and 5G System to support advanced V2X services (Release 16)", 3GPP TR 23. 786 V2.0.0 (Mar. 2019), 119 pages.

"Summary of Email Discussion [104#58][NR V2X]—QoS support for NRV2X", Agenda Item: 11.4.5, Source: Huawei (Rapporteur), 3GPP TSG-RAN WG2 Meeting #105 R2-1900370, Athens, Greece, Feb. 25-Mar. 1, 2019, 57 pages.

"Summary of [104#55][NRN2X] Unicast (OPPO)", Agenda Item: 11.4.2.1, Source: OPPO, 3GPP TSG-RAN WG2 Meeting #105, R2-1900180, Athens, Greece, Feb. 25-Mar. 1, 2019, 28 pages.

"Discussion on QoS design for NR PCS communication", Agenda Item: 11.4.5, Source: Qualcomm Incorporated, 3GPP TSG-RAN WG2 Meeting #105, R2-1901729, Athens, Greece, Feb. 25-Mar. 1, 2019, 6 pages.

\* cited by examiner sending, by a first terminal, a request message carrying a first QoS parameter to a second terminal, wherein the request message is used for indicating to perform a connection operation between the first terminal and the second terminal for the first QoS parameter ~ S101

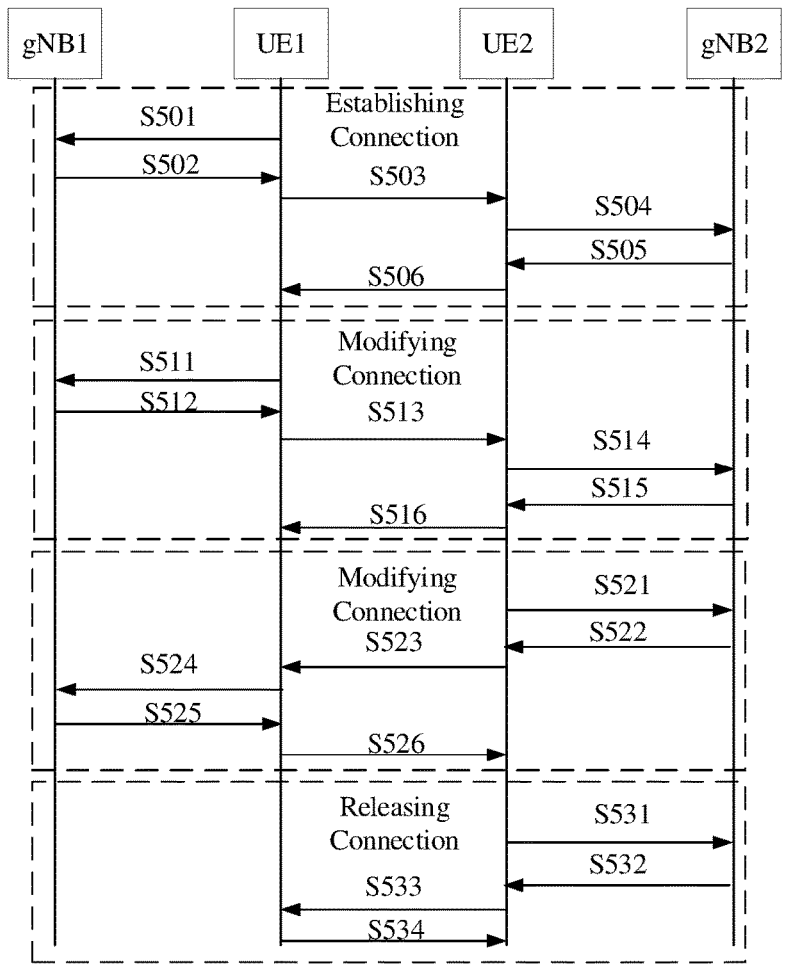

S501 QoS parameters related to UE1 and/or UE2
S502 first configuration information
S503 request message for establishing a connection
S504 QoS parameters related to UE2 and/or UE1
S505 second configuration information
S506 response message
S521 QoS parameters related to UE2 and/or UE1
S522 second configuration information
S523 request message for modifying a connection
S524 QoS parameters related to UE1 and/or UE2
S525 first configuration information
S526 response message S511 QoS parameters related to UE1 and/or UE2
S512 first configuration information
S513 request message for modifying a connection
S514 QoS parameters related to UE2 and/or UE1
S515 second configuration information
S516 response message S531 QoS parameters related to UE2 and/or UE1
S532 second configuration information
S533 request message for releasing a connection
S534 response message

FIG. 5

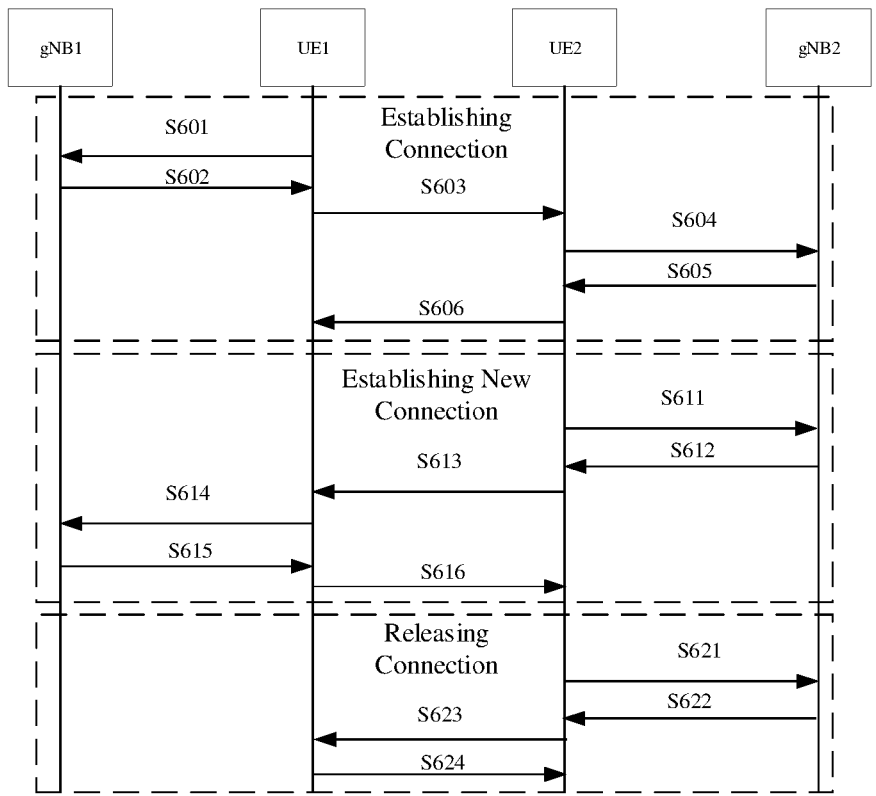

S601 QoS parameters related to UE1 and/or UE2
S602 first configuration information
S603 request message for establishing a connection
S604 QoS parameters related to UE2 and/or UE1
S605 second configuration information
S606 response message S611 QoS parameters related to UE2 and/or UE1
S612 second configuration information
S613 request message for establishing a new connection
S614 QoS parameters related to UE1 and/or UE2
S615 first configuration information
S616 response message S621 QoS parameters related to UE2 and/or UE1
S622 second configuration information
S623 request message for releasing a connection
S624 response message

FIG. 6

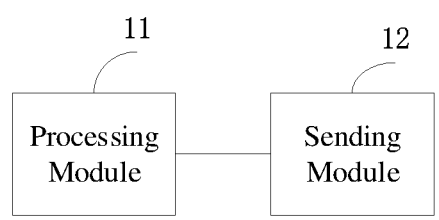

FIG. 7

US 11,375,397 B2

CONNECTION MANAGEMENT METHOD, APPARATUS, COMPUTER DEVICE AND STORAGE MEDIUM

RELATED REFERENCE TO RELATED APPLICATIONS

This application is a continuation of International Application No. PCT/CN2019/081789, filed on Apr. 8, 2019, which claims priority of International Application No. PCT/CN2019/080191 filed on Mar. 28, 2019, the entire contents of which are incorporated herein by reference

BACKGROUND

The present disclosure relates to the field of communications, and in particular to a connection management method, apparatus, computer device and storage medium.

Device-to-Device communication is a sidelink (SL) transmission technology. Compared to a conventional cellular system in which communication data is received or sent through a base station, D2D communication has higher spectrum efficiency and lower transmission delay.

In the 3rd Generation Partnership Project (3GPP), D2D is studied in three stages, that is, a proximity based service (ProSe), vehicle to X (V2X), and wearable devices (FeD2D). In a ProSe system, 3GPP defines a connection management mechanism based on a PC5 signaling protocol, which includes but is not limited to: connection establishment and release, connection security parameter configuration, connection channel quality monitoring, etc. In NR-V2X, due to a need to consider unicast and multicast services, the concept of connection exists between terminals, and 3GPP is discussing how to design a connection management mechanism, but there is still no specific plan.

SUMMARY

In a first aspect, an embodiment of the present disclosure provides a connection management method, which includes sending, by a first terminal, a request message carrying a first QoS parameter to a second terminal, wherein the request message is used for indicating to perform a connection operation between the first terminal and the second terminal for the first QoS parameter.

In a second aspect, an embodiment of the present disclosure provides a connection management method, which includes receiving, by a second terminal, a request message carrying a first QoS parameter sent by a first terminal, wherein the request message is used for indicating to perform a connection operation between the first terminal and the second terminal for the first QoS parameter.

In a third aspect, an embodiment of the present disclosure provides a connection management apparatus, including a processing module and a sending module; the processing module is configured to send a request message carrying a first QoS parameter to a second terminal through the sending module; wherein the request message is used for indicating to perform a connection operation between the first terminal and the second terminal for the first QoS parameter.

In a fourth aspect, an embodiment of the present disclosure provides a connection management apparatus, including a processing module and a receiving module; the processing module is configured to receive a request message carrying a first QoS parameter sent by a first terminal through the receiving module; wherein the request message is used for indicating to perform a connection operation between the first terminal and the second terminal for the first QoS parameter.

In a fifth aspect, an embodiment of the present disclosure provides a computer device including a memory and a processor, the memory stores a computer program, and the processor implements steps of the method of the first aspect or the second aspect when executing the computer program.

In a sixth aspect, an embodiment of the present disclosure provides a computer-readable storage medium on which a computer program is stored, and the computer program, when executed by a processor, implements steps of the method of the first aspect or the second aspect.

BRIEF DESCRIPTION OF THE DRAWINGS

FIG. 5 is a flowchart of a single connection management process provided by an embodiment of the present disclosure;

FIG. 6 is a flowchart of a dual connection management process provided by an embodiment of the present disclosure FIG. 7 is a block diagram of a connection management apparatus provided by an embodiment of the present disclosure;

DETAILED DESCRIPTION

In order to make objects, technical solutions, and advantages of the present disclosure more clear, the present disclosure will be described in further detail below with reference to drawings and implementations. It should be understood that implementations described herein are only for the purpose of explaining the present disclosure and are not intended to limit the present disclosure.

Figures 1, 2:
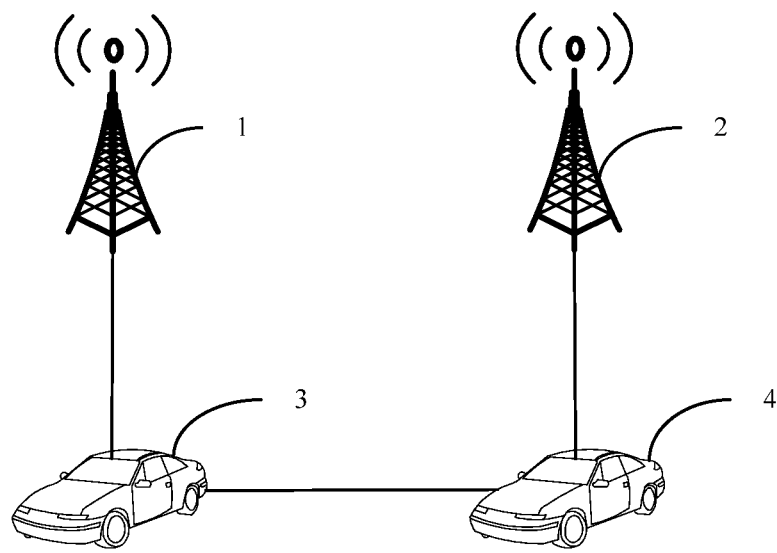
FIG. 1 is a schematic diagram of an application scenario of a connection management method provided by an embodiment of the present disclosure.
FIG. 2 is a flowchart of a connection management method provided by an embodiment of the present disclosure.

FIG. 1 is a schematic diagram of an application scenario of a connection management method provided by an embodiment of the present disclosure, and the scenario may be applied to a vehicle to X system. As shown in FIG. 1, this scenario includes an access network device 1, an access network device 2, a terminal 3 connected to the access network device 1, and a terminal 4 connected to the access network device 2. A communication between the terminal 3 and the terminal 4 is by means of sidelink communication, and a communication between the terminal and the access network device is by means of uplink/downlink communication. The access network device may be a base station, and the terminal may be a vehicle-mounted terminal.

Hereinafter, the technical solution of the present disclosure and how the technical solution of the present disclosure solves the above-mentioned technical problem will be described in detail through the embodiments and the accompanying drawings. The following specific embodiments may be combined with each other, and the same or similar concepts or processes may not be repeated in some embodiments. It should be noted that, in the connection management method provided by the embodiments of the present disclosure, different execution subjects are used to describe the corresponding embodiments.

FIG. 2 is a flowchart of a connection management method provided by an embodiment of the present disclosure. The method is performed by a first terminal, which may be the terminal 3 or the terminal 4 in FIG. 1. This method involves a process in which one terminal sends a request message to another terminal to request operations on the connection between the two terminals. As shown in FIG. 1, the method includes the following steps.

In S101, the first terminal sends a request message carrying a first QoS parameter to a second terminal, and the request message is used for indicating to perform a connection operation between the first terminal and the second terminal for the first QoS parameter.

The first QoS parameter is used for indicating the first terminal to request to perform the connection operation between the first terminal and the second terminal for a specific QoS attribute. The first QoS parameter may be a parameter obtained by the first terminal from a local storage, or may also be a parameter pre-allocated by a network device to the first terminal, or may also be a parameter obtained by the first terminal from the network device in real time. Optionally, the first QoS parameter includes but is not limited to at least one of the following information: a PC5 5G quality of service indicator (PQI), V2X 5G quality of service indicator (VQI), quality of service flow identifier (QFI), a data rate requirement, a communication range requirement, a correspondence between PQI, VQI, QFI, the data rate requirement, the communication range requirement and a radio bearer, a provider service identifier (PSID), and an intelligent transportation systems application identifier (ITS-AID). Optionally, the connection operation between the first terminal and the second terminal may include establishing a connection between the first terminal and the second terminal, modifying the connection between the first terminal and the second terminal, or releasing the connection between the first terminal and the second terminal. Optionally, the connection operation between the first terminal and the second terminal may also include switching the connection between the first terminal and the second terminal, changing a connection mode between the first terminal and the second terminal, and suspending the connection between the first terminal and the second terminal, etc., which is not limited by the present disclosure.

In this embodiment, when the first terminal needs to perform the connection operation between the first terminal and the second terminal for the first QoS parameter, the first terminal generates the request message carrying the first QoS parameter, and sends the request message to the second terminal. It may be that the network device instructs the first terminal to perform the connection operation between the first terminal and the second terminal for the first QoS parameter, or it may be that the first terminal initiates to perform the connection operation between the first terminal and the second terminal for the first QoS parameter according to a service type, a service status, or an existing connection condition.

In the connection management method provided by embodiments of the present disclosure, the first terminal sends the request message carrying the first QoS parameter to the second terminal, since the request message is used for indicating to perform the connection operation between the first terminal and the second terminal for the first QoS parameter, signaling interaction may be used for realizing the connection operation between terminals for a specific QoS parameter. A QoS management mechanism is designed for a QoS flow so as to solve the technical problem that a connection management between terminals in a NR-V2X system cannot be realized.

Optionally, in some embodiments, the first QoS parameter may not include the correspondence between PQI, VQI, QFI, the data rate requirement, the communication range requirement and the radio bearer. That is, the first QoS parameter may include at least one of the following information: PQI, VQI, QFI, the data rate requirement, the communication range requirement, PSID, and ITS-AID.

Further, the first terminal may separately send the correspondence between PQI, VQI, QFI, the data rate requirement, the communication range requirement and the radio bearer to the second terminal. One possible implementation includes the first terminal sends first parameter information to the second terminal; and the parameter information includes the correspondence between PQI, VQI, QFI, the data rate requirement, the communication range requirement and the radio bearer. Optionally, the first parameter information is carried in a radio resource control (RRC) signaling sent to the second terminal. Optionally, the request message is carried in the RRC signaling including the first parameter information. In this embodiment, the first terminal may make the first parameter information containing the correspondence between PQI, VQI, QFI, the data rate requirement, the communication range requirement and the radio bearer to be carried in the RRC signaling, and send it to the second terminal along with the request message.

Figure 3:
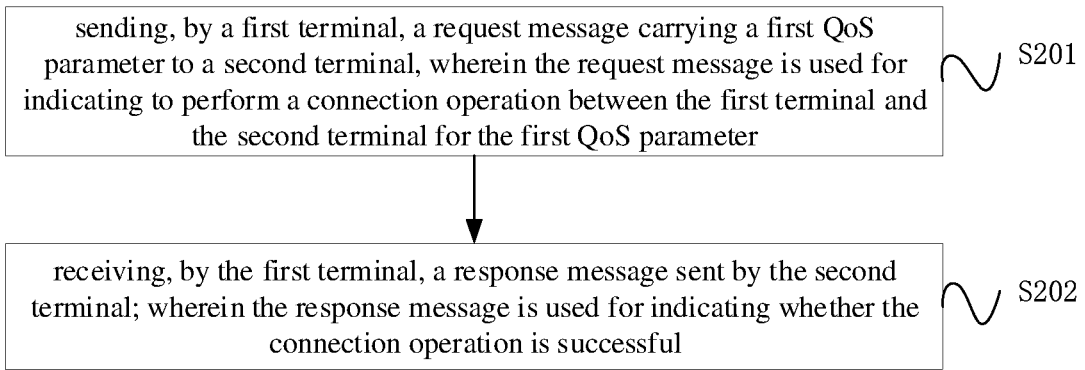
FIG. 3 is a flowchart of a connection management method provided by another embodiment of the present disclosure.

FIG. 3 is a flowchart of a connection management method provided by another embodiment of the present disclosure. This embodiment involves a specific implementation process in which the second terminal responds to the request message of the first terminal. As shown in FIG. 3, the method includes the following steps.

In S201, the first terminal sends a request message carrying a first QoS parameter to a second terminal, and the request message is used for indicating to perform a connection operation between the first terminal and the second terminal for the first QoS parameter.

For the implementation principle and process description of this embodiment, refer to S101 of the embodiment in FIG. 2, and details are not described herein again.

In S202, the first terminal receives a response message sent by the second terminal; and the response message is used for indicating whether the connection operation is successful.

In this embodiment, when the second terminal receives the request message carrying the first QoS parameter sent by the first terminal, it determines whether the second terminal may perform the connection operation with the first terminal according to the first QoS parameter, and carries a result in the response message for feeding back to the first terminal. The result may be that the second terminal agrees to perform the connection operation between the first terminal and the second terminal for the first QoS parameter, and the response message indicates that the connection operation is successful. For example, the second terminal can perform the connection operation between the first terminal and the second terminal for part or all of the QoS parameters in the first QoS parameters, and then the connection operation succeeds. Alternatively, the result may also be that the second terminal does not agree to perform the connection operation between the first terminal and the second terminal for the first QoS parameter, and the response message indicates that the connection operation failed. For example, the second terminal cannot perform the connection operation between the first terminal and the second terminal for all of the QoS parameters in the first QoS parameters, and the connection operation fails.

Optionally, when the response message indicates that the connection operation is successful, the response message may include part or all of the QoS parameters that the second terminal is capable of receiving; or, when the response message indicates that the connection operation is successful, and the second terminal is capable of receiving all the parameters in the first QoS parameters, the response message may not include the QoS parameters, and only indicates the connection operation is successful. Optionally, when the response message indicates the connection operation fails, the response message may not include the QoS parameters, and only indicates the connection operation fails.

In some embodiments, when the second terminal replies the response message to the first terminal, the response message includes a second QoS parameter. Optionally, the second QoS parameter is a QoS parameter acceptable to the second terminal. Optionally, the second QoS parameter is a subset of the first QoS parameters.

Further, the second QoS parameter includes at least one of the following information: PQI, VQI, QFI, the data rate requirement, the communication range requirement, the correspondence between PQI, VQI, QFI, the data rate requirement, the communication range requirement and the radio bearer, PSID, and ITS-AID.

Optionally, in some embodiments, the second QoS parameters may not include the correspondence between PQI, VQI, QFI, the data rate requirement, the communication range requirement and the radio bearer. That is, the second QoS parameter may include at least one of the following information: PQI, VQI, QFI, the data rate requirement, the communication range requirement, PSID, and ITS-AID.

Exemplarily, the second terminal may separately send the correspondence between PQI, VQI, QFI, the data rate requirement, the communication range requirement and the radio bearer to the first terminal. One possible implementation includes the first terminal receives second parameter information sent by the second terminal, and the second parameter information includes the correspondence between PQI, VQI, QFI, the data rate requirement, the communication range requirement and the radio bearer. Optionally, the second parameter information is carried in the RRC signaling sent to the first terminal. Optionally, the response message is carried in the RRC signaling including the second parameter information. In this embodiment, the second terminal may make the second parameter information containing the correspondence between PQI, VQI, QFI, the data rate requirement, the communication range requirement and the radio bearer to be carried in the RRC signaling, and send it to the first terminal along with the request message.

In this embodiment, when the second terminal accepts the foregoing connection operation, the response message may carry QoS parameters acceptable to the second terminal. For example, the first QoS parameters carried in the request message sent by the first terminal include mapping relationships of PQI, QFI, the communication range requirement and the radio bearer and PSID, and the QoS parameters of the second terminal include mapping relationships of PQI, the communication range requirement and the radio bearer, PSID and ITS-AID, and then the second QoS parameters acceptable to the second terminal for the first QoS parameters may include the mapping relationships of PQI, the communication range requirement and the radio bearer, and PSID.

In the connection management method provided in this embodiment, the first terminal sends the request message carrying the first QoS parameter to the second terminal, and the second terminal replies to the first terminal with a response message. Since the request message is used for indicating to perform the connection operation between the first terminal and the second terminal for the first QoS parameter, and the second terminal responds to the request message, the connection management method is further improved. Signaling interaction may be used for realizing the connection operation between terminals for a specific QoS parameter. A QoS management mechanism is designed for a QoS flow so as to solve the technical problem that a connection management between terminals in a NR-V2X system cannot be realized.

Different connection operations correspond to different request messages. Hereinafter, three methods, that is, methods A, B, and C, are used for introducing methods for indicating various connection operations through the request message Method A: the connection operation includes the establishing the connection between the first terminal and the second terminal, and the request message includes the first QoS parameter corresponding to the connection between the first terminal and the second terminal to be established.

In this embodiment, when the first terminal establishes the connection between the first terminal and the second terminal for some QoS parameters, the QoS parameters required for the connection between the first terminal and the second terminal to be established may be added to the request message. For example, the first terminal needs to establish the connection between the first terminal and the second terminal for the QoS attributes such as PQI, the data rate requirement, the communication range requirement, and the radio bearer of PQI, and the first terminal adds PQI, the data rate requirement, the communication range requirement, and the radio bearer of PQI as the first QoS parameters to the request message such as to send to the second terminal. In addition, an operation type field may be added to the request message, and the operation type field may be set as an establishment identifier.

Method B: the connection operation includes the modifying the connection between the first terminal and the second terminal, and the request message includes the first QoS parameter corresponding to the connection between the first terminal and the second terminal to be modified.

In this embodiment, the connection between the first terminal and the second terminal may also be modified. For example, when the first terminal detects that a performance of a current connection cannot meet a service requirement, the connection may be modified, and the first terminal may specify the QoS attribute that need to be modified in the request message. For example, the first terminal wants to modify the connection between the first terminal and the second terminal for the three parameters of PQI, the data rate requirement, and the communication range requirement, and the first terminal adds PQI, the data rate requirement, and the communication range requirement as the first QoS parameters to the request message such as to send to the second terminal. The operation type field is set as a modification identifier.

Method C: the connection operation includes the releasing the connection between the first terminal and the second terminal, and the request message includes the first QoS parameter corresponding to the connection between the first terminal and the second terminal to be released.

In this embodiment, when the connection between the first terminal and the second terminal is idle and there is no service demand for a long time, the connection may be released to save resources. For example, the first terminal wants to release the connection between the terminal and the second terminal for the three parameters of PQI, the data rate requirement, and the communication range requirement, and the first terminal adds PQI, the data rate requirement, and the communication range requirement as the first QoS parameters to the request message such as to send to the second terminal. The operation type field is set as a release identifier. Optionally, the connection operation includes releasing the connection between the first terminal and the second terminal, and the request message may also include an ID of the connection between the first terminal and the second terminal to be released, thereby directly indicating which connection to be released.

In the above embodiment, different request messages are set for different connection operations, and different connection operations may be quickly realized by changing the QoS parameters in the request message and the operation type indication of the request message. The method is flexible and changeable, the method is simple, and may be flexibly applied to various scenarios.

In the above embodiment, there may be multiple connections between the first terminal and the second terminal, and different connections correspond to different parameters. Optionally, the connection between the first terminal and the second terminal is a connection for at least one of the following information a QoS flow, PSID, ITS-AID, PQI, VQI, QFI, the data rate requirement, the communication range requirement, and an application layer ID. That is, the connection between the first terminal and the second terminal may be a connection for any above information, or may be a connection for multiple pieces of information. Different parameters may be flexibly selected to establish the connection between the first terminal and the second terminal according to the service requirement, which is not limited by the present disclosure. Establishing the connection between the terminals in this manner may flexibly adapt to multiple scenarios, meet various service requirements, and may also avoid the waste of resources or insufficient resources caused by the fixed connection between the terminals.

In the above-mentioned embodiment, there may be multiple connections between the first terminal and the second terminal at the same time. When there is a need to perform the operations on a connection between the terminals, the first terminal and the second terminal must be clear about on which connection the operation is performed. Therefore, the request message and/or the response message include a connection identification (ID), and the connection ID is used for distinguishing different connections between the first terminal and the second terminal, so as to ensure the accuracy of QoS connection management. Optionally, the request message and the response message may also include information related to the connection ID, which is used for indicating the ID of the connection to be operated.

Optionally, at least one of the following information corresponding to the different connections between the first terminal and the second terminal is different: an Internet protocol (IP) address, the application layer ID, PSID, ITS-AID, PQI, VQI, L2ID, the data rate requirement, the communication range requirement. That is to say, if the two connections between the first terminal and the second terminal have one different piece of the above information, the two connections are also different.

In some embodiments, multiple connections need to be established between the first terminal and the second terminal. In order to avoid the establishment of repeated connections, the following six methods may be adopted.

A first method: the request message includes an application layer ID and/or L2ID used by the first terminal, and the application layer ID used by the first terminal is different from an application layer ID used by a current connection, and the L2ID used by the first terminal is different from L2ID used by the current connection.

In this embodiment, the first terminal may directly add the application layer ID and/or L2ID used by the first terminal to the request message, and the application layer ID and L2ID used by the first terminal are different from the application layer ID and L2ID used by the current connection. For example, user A has registered two social accounts A1 and A2 at the same time, and the social accounts A1 and A2 are both used to process the same service, user A and user B have established a connection for the social account A1, but the user B is not aware that the user A further has the social account A2. Then the user A may add the social account A2 to the request message when sending the request message to a terminal of the user B through the terminal, thereby avoiding establishing the same connection between the terminal of the user A and the terminal of the user B for the social account A2, and avoiding waste of resources.

A second method: the first terminal sends a first connection update request message to the second terminal; and the first connection update request message includes an application layer ID and/or L2ID used by the first terminal, the application layer ID used by the first terminal is different from an application layer ID used by a current connection, and the L2ID used by the first terminal is different from L2ID used by the current connection.

In this embodiment, the first terminal may also separately send the first connection update request message to the second terminal, and inform the second terminal of the application layer ID and/or L2ID used by the first terminal. Taking user A and user B in the first method as an example, the terminal of the user A may send the first connection update request message carrying the social account A2 to the terminal of the user B.

A third method: the response message includes an application layer ID and/or L2ID used by the second terminal, and the application layer ID used by the second terminal is different from an application layer ID used by a current connection, and the L2ID used by the second terminal is different from L2ID used by the current connection.

In this embodiment, similar to the first method, the second terminal may also carry the application layer ID and/or L2ID used by the second terminal in the response message, and the application layer ID and L2ID used by the second terminal are different from the application layer ID and L2ID used by the current connection. For example, the user A has registered a social account A1, and the user B has registered social accounts B1 and B2, and the social accounts B1 and B2 are both used to process the same service, user A and user B have established a connection for the social accounts A1 and B1, but the user A is not aware that the user B further has the social account B2. Then the user B may add the social account B2 to the response message when sending the response message to a terminal of the user A1 through the terminal, thereby avoiding establishing the same connection between the terminal of the user A and the terminal of the user B for the social account B2, and avoiding waste of resources.

A fourth method: the first terminal receives a second connection update request message sent by the second terminal; and the second connection update request message includes an application layer ID and/or L2ID used by the second terminal, and the application layer ID used by the second terminal is different from an application layer ID used by a current connection, and the L2ID used by the second terminal is different from L2ID used by the current connection.

In this embodiment, the second terminal may also separately send the first connection update request message to the first terminal, and inform the first terminal of the application layer ID and/or L2ID used by the second terminal. Taking user A and user B in the first method as an example, the terminal of the user B may send the second connection update request message carrying the social account B2 to the terminal of the user A.

A fifth method: the first terminal sends a first access layer message to the second terminal; and the first access layer message includes an application layer ID and/or L2ID used by the first terminal, the application layer ID used by the first terminal is different from an application layer ID used by a current connection, and the L2ID used by the first terminal is different from L2ID used by the current connection.

A sixth method: the first terminal receives a second access layer message sent by the second terminal; and the second access layer message includes an application layer ID and/or L2ID used by the second terminal, and the application layer ID used by the second terminal is different from an application layer ID used by a current connection, and the L2ID used by the second terminal is different from L2ID used by the current connection.

In the embodiments of the above-mentioned fifth or sixth methods, the application layer ID and/or L2ID used by the first terminal or the second terminal may also be carried in the access layer message for transmission. For example, the first terminal carries the application layer ID and/or L2ID used by the first terminal in the first access layer message such as to send to the second terminal. The second terminal carries the application layer ID and/or L2ID used by the second terminal in the second access layer such as to send to the first terminal.

In the above-mentioned embodiments, the first terminal and the second terminal inform each other of the application layer ID and/or L2ID that are used differently from the current connection in a variety of ways, so as to avoid establishing completely the same connection between the first terminal and the second terminal, thereby avoiding the waste of resources.

In some scenarios, in the process of request message transmission, a physical ID of the terminal may also be carried in an implicit manner. Optionally, the request message is transmitted based on the L2ID of the transmission layer, and the L2ID and the L2ID used by other sending terminals satisfy a preset mapping relationship. Optionally, the mapping relationship is a mapping relationship defined for the first terminal. Optionally, the mapping relationship is a mapping relationship defined for the connection between the first terminal and the second terminal.

In this embodiment, the second terminal can infer whether the L2ID physically belongs to the ID of the same terminal according to the mapping relationship. For example, the second terminal can infer whether it physically belongs to the ID of the same terminal through different L2IDs. For example, for L2ID-1 and L2ID-2, the same result may be obtained by using the same function f( ) which means that L2ID-1 and L2ID-2 are IDs belonging to the same terminal; or by using different functions f1( ) and f2( ) the same result may be obtained, which means that L2ID-1 and L2ID-2 are IDs belonging to the same terminal. The above functions f/f1/f2 may be a function shared by different terminals, different first terminals may use different functions, or different functions are used for different connections between the first terminal and the second terminal.

Optionally, the request message is transmitted based on the L2ID of each transmission layer, and L2IDs are in one-to-one correspondence with different PSIDs and/or application layer IDs of the first terminal. Optionally, if any PSID and/or application layer ID of the first terminal changes, the L2ID changes.

It may be seen from the above embodiments that multiple connections may be established between two terminals at the same time. For example, a connection C has been established between the first terminal and the second terminal, but due to various reasons such as the service type, the network requirement, and connection quality. It is also necessary to establish a new connection between the first terminal and the second terminal. Optionally, the first terminal sends a request message for indicating to establish a new connection in at least one of the following situations: an IP address of an existing connection is not available for a new connection; an application layer ID of the existing connection is not available for the new connection; PSID of the existing connection is not available for the new connection; PQI of the existing connection is not available for the new connection; VQI of the existing connection is not available for the new connection; a data rate requirement of the existing connection is not available for the new connection; a communication range requirement of the existing connection is not available for the new connection; a radio bearer of the existing connection is not available for the new connection; and L2ID of the existing connection is not available for the new connection.

In this embodiment, when the first terminal determines that at least one of the IP address, the application layer ID, PSID, PQI, VQI, the data rate requirement, the communication range requirement, the radio bearer, and L2ID of the existing connection is not available for the new connection, the first terminal sends the request message for indicating to establish the new connection to the second terminal. The request message includes the QoS parameter corresponding to the new connection. Optionally, the request message for indicating to establish the new connection is carried in a PC5-S signaling or a PC5-RRC signaling. That is to say, the establishment of the new connection may be done through PC5-S signaling, or the establishment of the new connection may be done through PC5-RRC by access layer connection management.

According to the foregoing embodiments, after the first terminal triggers the establishment of the new connection, the established new connection includes at least one of the following information: an IP address of the new connection is different from an IP address of an existing connection; an application layer ID of the new connection is different from an application layer ID of the existing connection; PSID of the new connection is different from PSID of the existing connection; PQI, VQI, a data rate requirement, and a communication range requirement of the new connection are all different from PQI, VQI, a data rate requirement, and a communication range requirement of the existing connection; a radio bearer of the new connection is different from a radio bearer of the existing connection; and L2ID of the new connection is different from L2ID of the existing connection.

Further, the following explains the IP of the existing connection, the application layer ID of the existing connection, and the L2ID of the existing connection in the above embodiments respectively, where the IP address of the existing connection is an IP address of the first terminal and/or the second terminal; the IP address of the existing connection is an IP address of the first terminal and/or the second terminal in the existing connection; the application layer ID of the existing connection is an application layer ID of the first terminal and/or the second terminal; the application layer ID of the existing connection is an application layer ID of the first terminal and/or the second terminal in the existing connection; the L2ID of the existing connection is L2ID of the first terminal and/or the second terminal; and the L2ID of the existing connection is L2ID of the first terminal and/or the second terminal in the existing connection.

In the above-mentioned embodiment, when the existing connection cannot satisfy the QoS, the request message for sending the new connection may be sent again while the existing connection exists, so as to meet the service requirement and improve the QoS.

In some scenarios, the network indicates a specific implementation process of the connection operation between the first terminal and the second terminal through configuration information. Optionally, in the embodiment shown in FIG. 2, before S101 "the sending, by the first terminal, the request message carrying the first QoS parameter to a second terminal", the method may further include receiving, by the first terminal, configuration information sent by an access network device; and the configuration information is used for indicating whether to perform the connection operation between the first terminal and the second terminal for the first QoS parameter. Optionally, in the embodiment shown in FIG. 3, after S202 "the receiving, by the first terminal, the response message sent by the second terminal", the method may further include receiving, by the first terminal, configuration information sent by an access network device; and the configuration information is used for indicating whether to perform the connection operation between the first terminal and the second terminal for the first QoS parameter.

In this embodiment, the access network device may send the configuration information to the first terminal to indicate whether to perform the connection operation between the first terminal and the second terminal for the first QoS parameter. Optionally, the configuration information may include the first QoS parameter, or the configuration information may be specifically used for indicating a physical layer parameter for the first QoS parameter. Optionally, the physical layer parameter of the first QoS parameter may include at least one of the following information: a modulation and coding scheme (MCS), a hybrid automatic repeat request (HARQ), transmission power, a size of an available time-frequency resource, etc. Optionally, the configuration information is carried in a system message or the RRC signaling sent to the first terminal.

Optionally, different types of core network devices correspond to different configuration information. For example, for a 4G core network (EPC), the configuration information includes at least one of the following information: PQI, VQI, the data rate requirement, the communication range requirement; for a 5G core network (5GC), the configuration information includes QFI. In this embodiment, only EPC and 5GC are taken as examples to illustrate that the configuration information corresponding to different types of core network devices is different, and it is not limited thereto.

Further, before the first terminal receives the configuration information sent by the access network device, the method may further include reporting, by the first terminal, a third QoS parameter to the access network device. Optionally, the third QoS parameter includes at least one of the following information: PQI, VQI, QFI, a data rate requirement, a communication range requirement, a correspondence between PQI, VQI, QFI, the data rate requirement, the communication range requirement and a radio bearer, PSID, and ITS-AID. The correspondence between PQI, VQI, QFI, the data rate requirement, the communication range requirement and the radio bearer may include a correspondence sent by the second terminal for configuring a correspondence used by the first terminal. Optionally, third QoS parameters corresponding to different types of core network devices are different.

In this embodiment, the first terminal may report the third QoS parameter of the connection between the terminals that needs to be established/modified/released to the access network device. The third QoS parameter includes at least one of the following but is not limited to: PQI, VQI, QFI, a data rate requirement, a communication range requirement, a correspondence between QFI, PQI, VQI, QFI, the data rate requirement, the communication range requirement and the radio bearer (bearer mapping), PSID, and ITS-AID, etc. For example, to distinguish the network based on EPC or 5GC, the first terminal reports different third QoS parameters, respectively. For EPC, the third QoS parameters include at least one of the following: PQI, VQI, the data rate requirement, the communication range requirement-bearer mapping; for 5GC, the third QoS parameter includes at least one of the following, QFI, QFI-bearer mapping. The access network device sends the determined QoS parameters that the first terminal can support to the first terminal through the configuration information.

Optionally, the first terminal reports a channel quality parameter of the connection from the first terminal to the second terminal to the access network device; the channel quality information includes at least one of a channel busy rate, RSRP, RSRQ, SINR, and RSSI. Different channel quality parameters correspond to different configuration information. Optionally, the configuration information is specifically used for determining whether to perform the connection operation between the first terminal and the second terminal for the first QoS parameter according to the channel quality information.

In the above embodiments, the terminal may report the third QoS parameter of the connection between the terminals that needs to be established/modified/released to the access network device, and may also report the channel quality parameter of the connection from the first terminal to the second terminal, so that the access network device can determine the configuration information that satisfies the QoS flow characteristics according to the third QoS parameter and the channel quality parameter and send it to the terminal, so that the terminal can determine the accurate first QoS parameter according to the configuration information, thereby effectively establishing, modifying or releasing the connection between the first terminal and the second terminal, and improving the reliability of the connection between the terminals.

Figure 4:
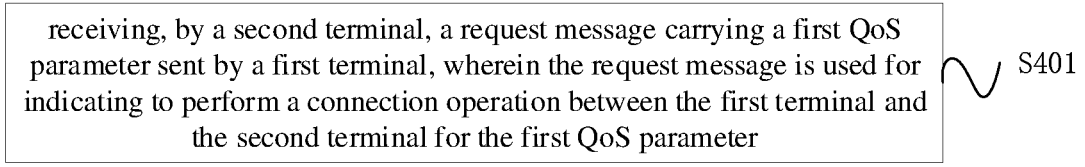
FIG. 4 is a flowchart of a connection management method provided by still another embodiment of the present disclosure.

FIG. 4 is a flowchart of a connection management method provided by another embodiment of the present disclosure. The execution subject of this method is the second terminal, and the second terminal may be the terminal 3 or the terminal 4 in FIG. 1. This method involves a process in which the terminal receives the request message sent by another terminal to perform operation on the connection between the two terminals As shown in FIG. 4, the method includes the following steps.

In S401, the second terminal receives a request message carrying a first QoS parameter sent by a first terminal, and the request message is used for indicating to perform a connection operation between the first terminal and the second terminal for the first QoS parameter.

For the implementation principles and beneficial effects of the embodiments of the present disclosure, reference may be made to the implementation principles and beneficial effects of the embodiment shown in FIG. 2, which will not be repeated here.

In one of the embodiments, the method further includes sending, by the second terminal, a response message to the first terminal; and the response message is used for indicating whether the connection operation is successful. Optionally, the response message includes a second QoS parameter; the second QoS parameter is a QoS parameter acceptable to the second terminal. Optionally, the second QoS parameter is a subset of the first QoS parameters.

In one of the embodiments, the connection operation includes at least one of the following: establishing a connection between the first terminal and the second terminal, modifying the connection between the first terminal and the second terminal, and releasing the connection between the first terminal and the second terminal.

In one of the embodiments, the connection operation includes the establishing the connection between the first terminal and the second terminal, and the request message includes the first QoS parameter corresponding to the connection between the first terminal and the second terminal to be established.

In one of the embodiments, the connection operation includes the modifying the connection between the first terminal and the second terminal, and the request message includes the first QoS parameter corresponding to the connection between the first terminal and the second terminal to be modified.

In one of the embodiments, the connection operation includes the modifying the connection between the first terminal and the second terminal, and the request message includes the first QoS parameter corresponding to the connection between the first terminal and the second terminal to be released.

In one of the embodiments, the first QoS parameter includes at least one of the following information: PQI, VQI, QFI, a data rate requirement, a communication range requirement, a correspondence between PQI, VQI, QFI, the data rate requirement, the communication range requirement and a radio bearer, PSID, and ITS-AID.

In one of the embodiments, the first QoS parameter includes at least one of the following information: PQI, VQI, QFI, a data rate requirement, a communication range requirement, PSID, and ITS-AID.

In one of the embodiments, the method further includes receiving, by the second terminal, first parameter information sent by the first terminal; and the first parameter information includes a correspondence between PQI, VQI, QFI, a data rate requirement, a communication range requirement and a radio bearer.

In one of the embodiments, the first parameter information is carried in a RRC signaling sent to the second terminal.

In one of the embodiments, the request message is carried in the RRC signaling including the first parameter information.

In one of the embodiments, the response message includes the second QoS parameter.

In one of the embodiments, the second QoS parameter is the QoS parameter acceptable to the second terminal.

In one of the embodiments, the second QoS parameter is the subset of the first QoS parameters.

In one of the embodiments, the second QoS parameter includes at least one of the following information: PQI, VQI, QFI, a data rate requirement, a communication range requirement, a correspondence between PQI, VQI, QFI, the data rate requirement, the communication range requirement and a radio bearer, PSID, and ITS-AID.

In one of the embodiments, the second QoS parameter includes at least one of the following information: PQI, VQI, QFI, a data rate requirement, a communication range requirement, PSID, and ITS-AID.

In one of the embodiments, the method further includes sending, by the second terminal, second parameter information to the first terminal; and the second parameter information includes a correspondence between PQI, VQI, QFI, a data rate requirement, a communication range requirement and a radio bearer.

In one of the embodiments, the second parameter information is carried in the RRC signaling sent to the first terminal.

In one of the embodiments, the response message is carried in the RRC signaling including the second parameter information.

In one of the embodiments, the connection between the first terminal and the second terminal is a connection for at least one of the following information: a QoS flow, PSID, ITS-AID, PQI, VQI, QFI, a data rate requirement, a communication range requirement, an application layer ID.

In one of the embodiments, the request message and/or the response message includes a connection identification (ID), and the connection ID is used for distinguishing different connections between the first terminal and the second terminal.

In one of the embodiments, at least one of the following information corresponding to the different connections between the first terminal and the second terminal is different: an IP address, an application layer ID, PSID, ITS-AID, PQI, VQI, L2ID, a data rate requirement, a communication range requirement.

In one of the embodiments, the request message includes an application layer ID and/or L2ID used by the first terminal, and the application layer ID used by the first terminal is different from an application layer ID used by a current connection, and the L2ID used by the first terminal is different from L2ID used by the current connection.

In one of the embodiments, the method further includes receiving, by the second terminal, a first connection update request message sent by the first terminal; and the first connection update request message includes an application layer ID and/or L2ID used by the first terminal, the application layer ID used by the first terminal is different from an application layer ID used by a current connection, and the L2ID used by the first terminal is different from L2ID used by the current connection.

In one of the embodiments, the response message includes an application layer ID and/or L2ID used by the second terminal, and the application layer ID used by the second terminal is different from an application layer ID used by a current connection, and the L2ID used by the second terminal is different from L2ID used by the current connection.

In one of the embodiments, the method further includes sending, by the second terminal, a second connection update request message to the first terminal; and the second connection update request message includes an application layer ID and/or L2ID used by the second terminal, and the application layer ID used by the second terminal is different from an application layer ID used by a current connection, and the L2ID used by the second terminal is different from L2ID used by the current connection.

In one of the embodiments, request message for indicating to establish a new connection is sent by the first terminal in at least one of the following situations: an IP address of an existing connection is not available for a new connection; an application layer ID of the existing connection is not available for the new connection; PSID of the existing connection is not available for the new connection; PQI of the existing connection is not available for the new connection; VQI of the existing connection is not available for the new connection; a data rate requirement of the existing connection is not available for the new connection; a communication range requirement of the existing connection is not available for the new connection; a radio bearer of the existing connection is not available for the new connection; and L2ID of the existing connection is not available for the new connection.

In one of the embodiments, the request message for indicating to establish the new connection is carried in a PC5-S signaling or a PC5-RRC signaling.

In one of the embodiments, the new connection includes at least one of the following information: an IP address of the new connection is different from an IP address of an existing connection; an application layer ID of the new connection is different from an application layer ID of the existing connection; PSID of the new connection is different from PSID of the existing connection; PQI, VQI, a data rate requirement, and a communication range requirement of the new connection are all different from PQI, VQI, a data rate requirement, and a communication range requirement of the existing connection; a radio bearer of the new connection is different from a radio bearer of the existing connection; and L2ID of the new connection is different from L2ID of the existing connection.

In one of the embodiments, the method further includes any one of the following information: the IP address of the existing connection is an IP address of the first terminal and/or the second terminal; the IP address of the existing connection is an IP address of the first terminal and/or the second terminal in the existing connection; the application layer ID of the existing connection is an application layer ID of the first terminal and/or the second terminal; the application layer ID of the existing connection is an application layer ID of the first terminal and/or the second terminal in the existing connection; the L2ID of the existing connection is L2ID of the first terminal and/or the second terminal; and the L2ID of the existing connection is L2ID of the first terminal and/or the second terminal in the existing connection.

In one of the embodiments, before the second terminal sends the response message to the first terminal, the method further includes receiving, by the second terminal, configuration information sent by an access network device; and the configuration information is used for indicating whether to perform the connection operation between the first terminal and the second terminal for the second QoS parameter.

In one of the embodiments, after the second terminal sends the response message to the first terminal, the method further includes receiving, by the second terminal, configuration information sent by an access network device; and the configuration information is used for indicating whether to perform the connection operation between the first terminal and the second terminal for the second QoS parameter.

In one of the embodiments, the configuration information is specifically used for indicating a physical layer parameter for the second QoS parameter.

In one of the embodiments, the configuration information is carried in a system message or a RRC signaling sent to the second terminal.

In one of the embodiments, different types of core network devices correspond to different configuration information.

In one of the embodiments, before the second terminal receives the configuration information sent by the access network device, the method further includes reporting, by the second terminal, a third QoS parameter to the access network device.

In one of the embodiments, the third QoS parameter includes at least one of the following information: PQI, VQI, QFI, a data rate requirement, a communication range requirement, a correspondence between PQI, VQI, QFI, the data rate requirement, the communication range requirement and a radio bearer, PSID, and ITS-AID.

In one of the embodiments, the correspondence includes a correspondence used by the first terminal, which is sent by the first terminal.

In one of the embodiments, the correspondence includes a correspondence sent by the first terminal for configuring a correspondence used by the second terminal.

In one of the embodiments, third QoS parameters corresponding to different types of core network devices are different.

In one of the embodiments, the method further includes reporting, by the second terminal, a channel quality parameter of a connection from the first terminal to the second terminal to the access network device; and the channel quality information includes at least one of a channel busy rate, RSRP, RSRQ, SINR, and RSSI.

In one of the embodiments, different channel quality parameters correspond to different configuration information.

In one of the embodiments, the configuration information is specifically used for determining whether to perform the connection operation between the first terminal and the second terminal for the second QoS parameter according to the channel quality information.

For the above-mentioned embodiments of the second terminal and various possible implementation manners, reference may be made to the embodiments of the first terminal, and details are not described herein again.

The following takes the scenario of FIG. 1 as an example, and FIGS. 5 and 6 introduce the implementations of a single connection management process and a dual connection management process, respectively. The scheme is further explained by taking the establishing a connection, modifying a connection, and releasing a connection as examples.

FIG. 5 is a flowchart of a single connection management process provided by an embodiment of the present disclosure. In this embodiment, the entire process is divided into four parts, that is, connection establishment, connection modification (twice), and connection release. As shown in FIG. 5, establishing a connection may include the following steps.

In S501, UE1 reports QoS parameters related to UE1 and/or UE2 to gNB1.

In S502, gNB1 sends first configuration information to UE1.

In S503, UE1 sends a request message for establishing a connection to UE2.

In S504, UE2 reports QoS parameters related to UE2 and/or UE1 to gNB2.

In S505, gNB2 sends second configuration information to UE2.

In S506, UE2 sends a response message to UE1.

Optionally, in this embodiment, S501 and S502 may also be after S506, which is not limited in the present disclosure.

As shown in FIG. 5, the UE1 initiating the connection modification may include the following steps.

In S511, UE1 reports QoS parameters related to UE1 and/or UE2 to gNB1.

In S512, gNB1 sends first configuration information to UE1.

In S513, UE1 sends a request message for modifying the connection to UE2.

In S514, UE2 reports QoS parameters related to UE2 and/or UE1 to gNB2.

In S515, gNB2 sends second configuration information to UE2.

In S516, UE2 sends a response message to UE1.

Optionally, in this embodiment, S511 and S512 may also be after S516, which is not limited in the present disclosure.

As shown in FIG. 5, the UE2 initiating the connection modification may include the following steps.

In S521, UE2 reports QoS parameters related to UE2 and/or UE1 to gNB2.

In S522, gNB2 sends second configuration information to UE2.

In S523, UE2 sends a request message for modifying the connection to UE1.

In S524, UE1 reports QoS parameters related to UE1 and/or UE2 to gNB1.

In S525, gNB1 sends second configuration information to UE1.

In S526, UE1 sends a response message to UE2.

Optionally, in this embodiment, S521 and S522 may also be after S526, which is not limited in the present disclosure.

As shown in FIG. 5, UE2 initiating the connection release may include the following steps.

In S531, UE2 reports QoS parameters related to UE2 and/or UE1 to gNB2.

In S532, gNB2 sends second configuration information to UE2.

In S533, UE2 sends a request message for releasing the connection to UE1.

In S534, UE1 sends a response message to UE2.

Optionally, in this embodiment, S531 and S532 may also be after S534, which is not limited in the present disclosure.

In this embodiment, for the QoS parameters, the configuration information, the response message, etc., reference may be made to the description of the foregoing embodiments, which will not be repeated here. In addition, the steps in this embodiment are not necessarily performed in sequence in the order indicated by the arrow. For example, the steps of UE reporting the QoS parameters to the base station and the base station sending the configuration information to UE are not necessarily executed every time. FIG. 5 is only a possible implementation, and the present disclosure is not limited to this.

FIG. 6 is a flowchart of a dual connection management process provided by an embodiment of the present disclosure. In this embodiment, the entire process is divided into three parts, that is, connection establishment (twice) and connection release. It should be noted that unlike the embodiment in FIG. 5, the embodiment in FIG. 6 also includes a process of establishing a new connection, and FIG. 6 may also include a process of modifying the connection, and the present disclosure is not limited to this. As shown in FIG. 6, establishing a connection may include the following steps.

In S601, UE1 reports QoS parameters related to UE1 and/or UE2 to gNB1.

In S602, gNB1 sends first configuration information to UE1.

In S603, UE1 sends a request message for establishing a connection to UE2.

In S604, UE2 reports QoS parameters related to UE2 and/or UE1 to gNB2.

In S605, gNB sends second configuration information to UE2.

In S606, UE2 sends a response message to UE1.

Optionally, in this embodiment, S601 and S602 may also be after S606, which is not limited in the present disclosure.

As shown in FIG. 6, UE2 initiating the establishment of the new connection may include the following steps.

In S611, UE2 reports QoS parameters related to UE2 and/or UE1 to gNB2.

In S612, gNB2 sends second configuration information to UE2.

In S613, UE2 sends a request message for establishing a new connection to UE1.

In S614, UE1 reports QoS parameters related to UE1 and/or UE2 to gNB1.

In S615, gNB1 sends second configuration information to UE1.

In S616, UE1 sends a response message to UE2.

Optionally, in this embodiment, S611 and S612 may also be after S616, which is not limited in the present disclosure.

As shown in FIG. 6, UE2 initiating the connection release may include the following steps.

In S621, UE2 reports QoS parameters related to UE2 and/or UE1 to gNB2.

In S622, gNB2 sends second configuration information to UE2.

In S623, UE2 sends a request message for releasing the connection to the UE1.

In S624, UE1 sends a response message to UE2.

Optionally, in this embodiment, S621 and S622 may also be after S624, which is not limited in the present disclosure.

In this embodiment, for the QoS parameters, the configuration information, the response message, etc., reference may be made to the description of the foregoing embodiments, which will not be repeated here. In addition, the steps in this embodiment are not necessarily performed in sequence in the order indicated by the arrow. For example, the steps of UE reporting the QoS parameters to the base station and the base station sending the configuration information to UE are not necessarily executed every time. FIG. 6 is only a possible implementation, and the present disclosure is not limited to this.

It should be understood, although blocks in the flowcharts of FIGS. 2-6 are illustrated in sequence as indicated by arrows, the blocks are not necessarily performed in sequence as indicated by the arrows. Unless otherwise specifically specified in the specification, the execution of the blocks is not strictly limited, and the blocks may be performed in other sequences. Moreover, at least some of the blocks in FIGS. 2-6 may include several sub-blocks or stages, which are not necessarily performed simultaneously, but may be executed at different times. The execution sequence of these sub-blocks or stages is not necessarily performed sequentially, but may be performed alternately with at least a portion of other blocks, or sub-blocks or stages of other blocks.

FIG. 7 is a block diagram of a connection management apparatus provided by an embodiment of the present disclosure. As shown in FIG. 7, the apparatus includes a processing module 11 and a sending module 12; the processing module 11 is configured to send a request message carrying a first QoS parameter to a second terminal through the sending module 12; and the request message is used for indicating to perform a connection operation between a first terminal and the second terminal for the first QoS parameter.

Figure 8:
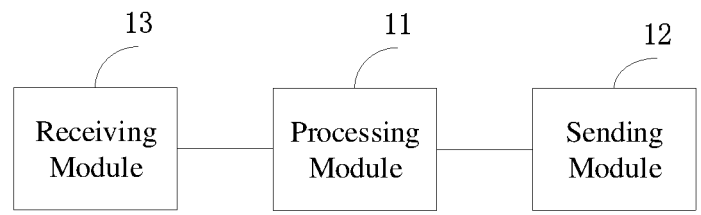
FIG. 8 is a block diagram of a connection management apparatus provided by another embodiment of the present disclosure.

In one of the embodiments, as shown in FIG. 8, the apparatus further includes a receiving module 13, configured to receive a response message sent by the second terminal; and the response message is used for indicating whether the connection operation is successful.

Figure 9:
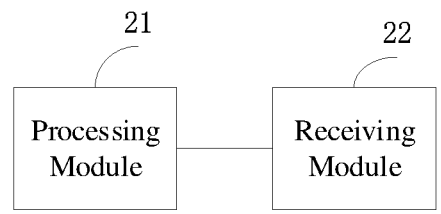
FIG. 9 is a block diagram of a connection management apparatus provided by an embodiment of the present disclosure.

FIG. 9 is a block diagram of a connection management apparatus provided by an embodiment of the present disclosure. As shown in FIG. 9, the apparatus includes a processing module 21 and a receiving module 22; the processing module 21 is configured to receive a request message carrying a first QoS parameter sent by a first terminal through the receiving module 22; and the request message is used for indicating to perform a connection operation between the first terminal and a second terminal for the first QoS parameter.

Figure 10:
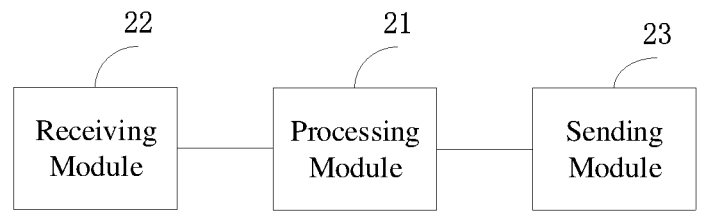
FIG. 10 is a block diagram of a connection management apparatus provided by another embodiment of the present disclosure.

In one of the embodiments, as shown in FIG. 10, the apparatus further includes a sending module 23, configured to send a response message to the first terminal; and the response message is used for indicating whether the connection operation is successful.

For specific definitions of the connection management apparatus, reference may be made to the above definition of the connection management method, which will not be elaborated here. Respective modules of the above-described connection management device may be implemented in whole or in part by software, hardware, and the combination thereof. Each of the above modules may be embedded in or independent of the processor in the computer device, or may be stored in a memory in the computer device in a software form, so that the processor invokes them to execute the operations corresponding to the above modules.

The embodiments of the present disclosure also provide a computer device, including a memory and a processor, the memory storing a computer program, and the processor implements steps of the method described in any of the foregoing embodiments when executing the computer program.

The embodiments of the present disclosure also provide a computer-readable storage medium having a computer program stored thereon, and the computer program, when executed by a processor, implements steps of the method described in any of the above embodiments.

Figure 11:
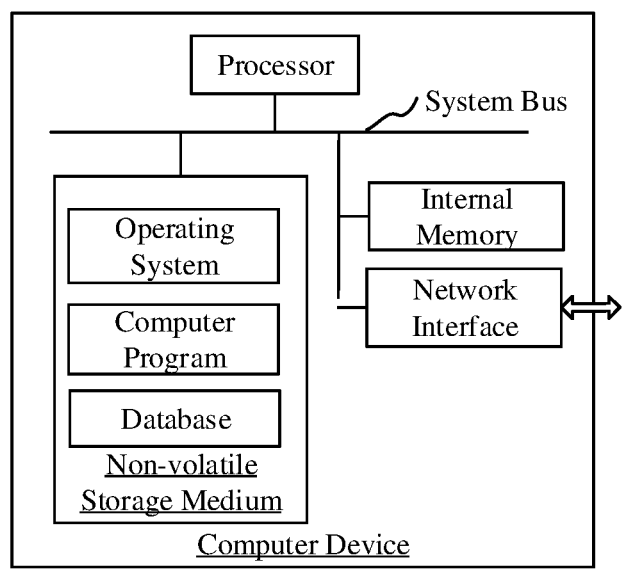
FIG. 11 is a block diagram of a computer device provided by an embodiment of the present disclosure.

In an embodiment, there is provided a computer device. The computer device may be a server, and its internal structure diagram may be as shown in FIG. 11. The computer device includes a processor, a memory, a network interface, and a database connected through a system bus. The processor of the computer device is configured to provide calculation and control capabilities. The memory of the computer device includes a non-volatile storage medium and an internal memory. The non-volatile storage medium stores an operating system, a computer program, and a database. The internal memory provides an environment for running the operating system and the computer program in the non-volatile storage medium. The database of the computer equipment is configured to store data such as the QoS parameter and the configuration information. The network interface of the computer device is configured to communicate with an external terminal through a network connection. The computer program is executed by the processor to realize the connection management method.

Those skilled in the art may understand that the structure shown in FIG. 11 is only a block diagram of a part of the structure related to the solution of the present disclosure, and does not constitute a limitation on the computer device to which the solution of the present disclosure is applied. A specific computer device may include more or less parts than shown in the figure, or combine some parts, or have a different part arrangement.

Those ordinary skilled in the art may understand that all or part of the processes in the method of the foregoing embodiments may be implemented by instructing relevant hardware by a computer program. The computer program may be stored in a non-volatile computer readable storage medium. When the computer program is executed, procedures of the above-mentioned method embodiments may be included. Any reference to the memory, the storage, the database, or other media used in the embodiments provided by the present disclosure may include a non-volatile and/or a volatile memory. The suitable non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external cache memory. By way of illustration, rather than limitation, the RAM is available in a variety of forms such as a static RAM (SRAM), a dynamic RAM (DRAM), a synchronous DRAM (SDRAM), a double data rate SDRAM (DDR SDRAM), an enhanced SDRAM (ESDRAM), a Synchlink DRAM (SLDRAM), a Rambus direct RAM (RDRAM), a direct Rambus dynamic RAM (DRDRAM), and a Rambus dynamic RAM (RDRAM).

The technical features of the above-mentioned implementations may be combined in any combination. For brevity of description, not all possible combinations of the technical features in the above implementations are described. However, as long as there is no contradiction in combination of these technical features, it should be considered as the scope of the present specification. The implementations described above only provide several implementations of the present disclosure, and their descriptions are relatively specific and detailed, but they are not to be construed as limiting the protection scope of the present disclosure. It should be noted that for those of ordinary skill in the art, variations and improvements may be made without departing from the concept of the present disclosure, which fall within the protection scope of the present disclosure. The protection scope of the present disclosure is defined by the appended claims.

What is claimed is:

1. A method for connection management, comprising:
sending, by a first terminal, a request message carrying a first QoS parameter to a second terminal, wherein the request message is used for indicating to perform a connection operation between the first terminal and the second terminal according to the first QoS parameter,
wherein the connection between the first terminal and the second terminal comprises connection for QoS flow, and the connection operation comprises at least one of the following:
establishing a connection between the first terminal and the second terminal,
modifying the connection between the first terminal and the second terminal, or
releasing the connection between the first terminal and the second terminal,
wherein the request message for indicating to establish a new connection is sent by the first terminal in the following situation:
an application layer ID of an existing connection is not available for the new connection, and
wherein the request message for indicating to establish the new connection is carried in a PC5-S signaling or a PC5-RRC signaling.

2. The method according to claim 1, wherein the method further comprises:
receiving, by the first terminal, a response message sent by the second terminal,
wherein the response message is used for indicating whether the connection operation is successful.

3. The method according to claim 1, wherein the connection operation comprises the establishing the connection between the first terminal and the second terminal, and the request message comprises the first QoS parameter corresponding to the connection between the first terminal and the second terminal to be established.

4. The method according to claim 1, wherein the connection operation comprises the modifying the connection between the first terminal and the second terminal, and the request message comprises the first QoS parameter corresponding to the connection between the first terminal and the second terminal to be modified.

5. The method according to claim 1, wherein the connection operation comprises the releasing the connection between the first terminal and the second terminal, and the request message comprises the first QoS parameter corresponding to the connection between the first terminal and the second terminal to be released.

6. The method according to claim 1, wherein the first QoS parameter comprises at least one of the following information: PQI, QFI, a data rate requirement, PSID, and ITS-AID.

7. The method according to claim 2, wherein the response message comprises a second QoS parameter.

8. The method according to claim 7, wherein the second QoS parameter is a QoS parameter acceptable to the second terminal.

9. The method according to claim 7, wherein the second QoS parameter comprises at least one of the following information: PQI, QFI, a data rate requirement, PSID, and ITS-AID.

10. The method according to claim 1, wherein the method further comprises any one of the following information:
the IP address of the existing connection is an IP address of at least one of the first terminal or the second terminal;
the IP address of the existing connection is an IP address of at least one of the first terminal or the second terminal in the existing connection;
the application layer ID of the existing connection is an application layer ID of at least one of the first terminal or the second terminal;
the application layer ID of the existing connection is an application layer ID of at least one of the first terminal or the second terminal in the existing connection;
the L2ID of the existing connection is L2ID of at least one of the first terminal or the second terminal; and
the L2ID of the existing connection is L2ID of at least one of the first terminal or the second terminal in the existing connection.

11. A method for connection management, comprising:
receiving, by a second terminal, a request message carrying a first QoS parameter sent by a first terminal, wherein the request message is used for indicating to perform a connection operation between the first terminal and the second terminal according to the first QoS parameter,
wherein the connection between the first terminal and the second terminal comprises connection for QoS flow, and the connection operation comprises at least one of the following:
establishing a connection between the first terminal and the second terminal,
modifying the connection between the first terminal and the second terminal, or
releasing the connection between the first terminal and the second terminal,
wherein the request message for indicating to establish a new connection is received by the second terminal in the following situation:
an application layer ID of an existing connection is not available for the new connection, and
wherein the request message for indicating to establish the new connection is carried in a PC5-S signaling or a PC5-RRC signaling.

12. A computer device comprising a memory and a processor, the memory storing a computer program, wherein the processor is configured to execute the computer program to perform a connection management method, comprising:
sending, by a first terminal, a request message carrying a first QoS parameter to a second terminal, wherein the request message is used for indicating to perform a connection operation between the first terminal and the second terminal according to the first QoS parameter,
wherein the connection between the first terminal and the second terminal comprises connection for QoS flow, and the connection operation comprises at least one of the following:
establishing a connection between the first terminal and the second terminal,
modifying the connection between the first terminal and the second terminal, or
releasing the connection between the first terminal and the second terminal,
wherein the request message for indicating to establish a new connection is sent by the first terminal in the following situation:
an application layer ID of an existing connection is not available for the new connection, and
wherein the request message for indicating to establish the new connection is carried in a PC5-S signaling or a PC5-RRC signaling.

13. The computer device according to claim 12, wherein the processor is further configured to perform:
receiving, by the first terminal, a response message sent by the second terminal,
wherein the response message is used for indicating whether the connection operation is successful.

14. The computer device according to claim 12, wherein the connection operation comprises the establishing the connection between the first terminal and the second terminal, and the request message comprises the first QoS parameter corresponding to the connection between the first terminal and the second terminal to be established.

15. The computer device according to claim 12, wherein the connection operation comprises the modifying the connection between the first terminal and the second terminal, and the request message comprises the first QoS parameter corresponding to the connection between the first terminal and the second terminal to be modified.

16. The computer device according to claim 12, wherein the connection operation comprises the releasing the connection between the first terminal and the second terminal, and the request message comprises the first QoS parameter corresponding to the connection between the first terminal and the second terminal to be released.

17. The computer device according to claim 12, wherein the first QoS parameter comprises at least one of the following information: PQI, QFI, a data rate requirement, PSID, and ITS-AID.

18. A computer device comprising a memory and a processor, the memory storing a computer program, wherein the processor is configured to execute the computer program to perform a connection management method, comprising:
receiving, by a second terminal, a request message carrying a first QoS parameter sent by a first terminal, wherein the request message is used for indicating to perform a connection operation between the first terminal and the second terminal according to the first QoS parameter,
wherein the connection between the first terminal and the second terminal comprises connection for QoS flow, and the connection operation comprises at least one of the following:
establishing a connection between the first terminal and the second terminal,
modifying the connection between the first terminal and the second terminal, or
releasing the connection between the first terminal and the second terminal,
wherein the request message for indicating to establish a new connection is received by the second terminal in the following situation:
an application layer ID of an existing connection is not available for the new connection, and
wherein the request message for indicating to establish the new connection is carried in a PC5-S signaling or a PC5-RRC signaling.

* * * * *

UNITED STATES PATENT AND TRADEMARK OFFICE
CERTIFICATE OF CORRECTION

PATENT NO. : 11,375,397 B2
APPLICATION NO. : 17/460017
DATED : June 28, 2022
INVENTOR(S) : Qianxi Lu et al.

Page 1 of 1

It is certified that error appears in the above-identified patent and that said Letters Patent is hereby corrected as shown below:

On the Title Page

Item [73] Assignee name should read:
GUANGDONG OPPO MOBILE TELECOMMUNICATIONS CORP., LTD., Dongguan (CN)

Signed and Sealed this
Twenty-ninth Day of November, 2022

Katherine Kelly Vidal
*Director of the United States Patent and Trademark Office*